United States Patent [19]
Smith

[11] 3,866,723
[45] Feb. 18, 1975

[54] SAFETY DEVICE FOR ACTUATING A BRAKE

[76] Inventor: Elmer M. Smith, 2425 Kuser Rd., Trenton, N.J. 08690

[22] Filed: Nov. 12, 1973

[21] Appl. No.: 414,769

[52] U.S. Cl. .................................. 188/109, 180/99
[51] Int. Cl. ............................................. B60t 7/14
[58] Field of Search ...... 180/99, 101, 102; 188/109, 188/106 R

[56] References Cited
UNITED STATES PATENTS

| | | | |
|---|---|---|---|
| 1,844,818 | 2/1932 | Gattie | 188/109 |
| 3,332,522 | 7/1967 | Dence | 188/109 |

Primary Examiner—Duane A. Reger
Attorney, Agent, or Firm—Sperry and Zoda

[57] ABSTRACT

Means for automatically activating a vehicle brake when a vehicle operator falls from or leaves his normal driving position in his seat, comprising a movable member associated with such operator's seat and operatively connected to the actuating lever of a conventional brake system in a manner that the vehicle brake will be automatically activated whenever the operator is not in his normal driving position. The operative connection between the movable member associated with the driver's seat and the brake actuating lever preferably is a lost motion and unidirectionally acting connection is preferably combined with means for manually engaging and/or releasing the vehicle brake.

5 Claims, 7 Drawing Figures

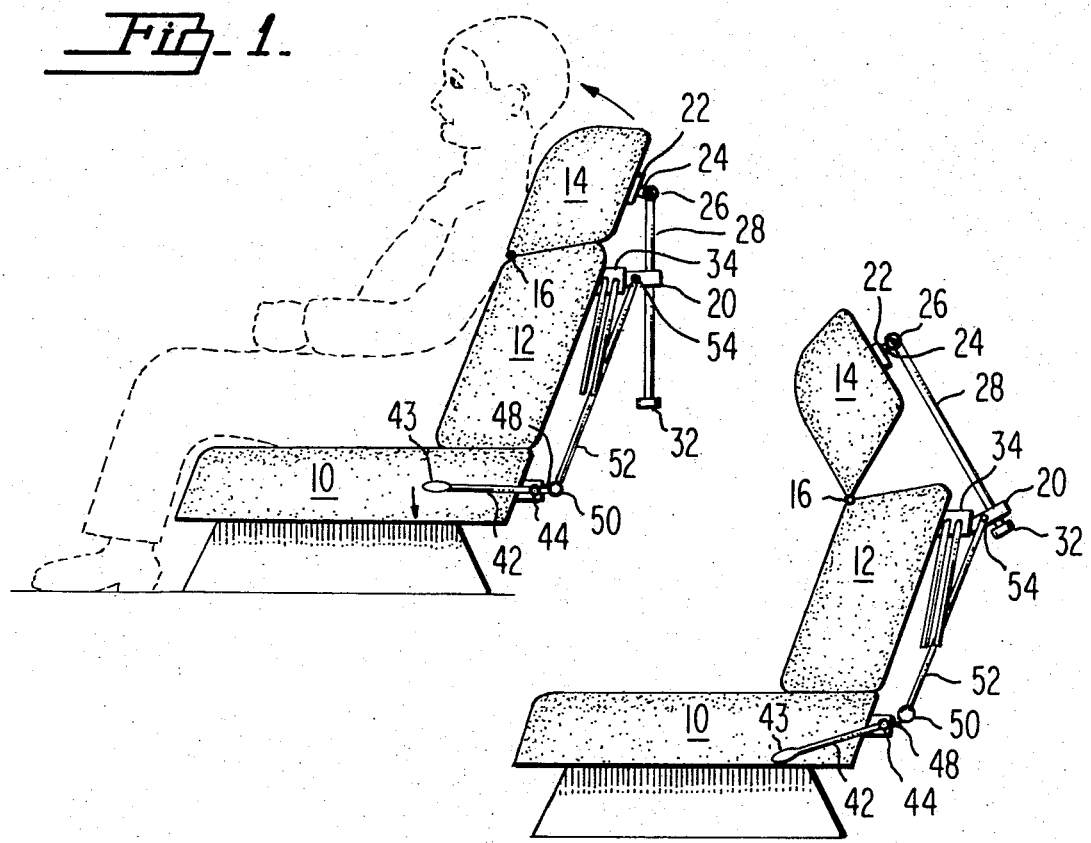
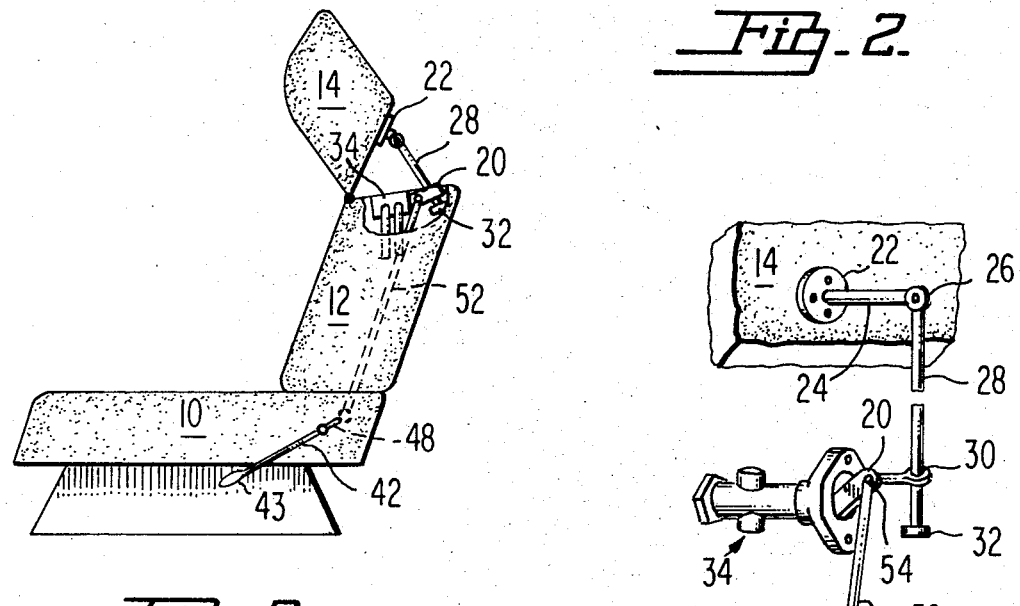

SAFETY DEVICE FOR ACTUATING A BRAKE

BACKGROUND OF THE INVENTION

1. Field of the Invention

The invention pertains to automatic brake actuating devices preferably as applied to conventional compressed air emergency, or parking brake systems, and in particular the invention pertains to devices which are responsive to the position of the vehicle operator in an operator's seat within the vehicle.

It should be understood that the terms "emergency brake" and "parking brake" are interchangable for purposes of this application and that either refers generally to conventional brake systems which may be applied while a vehicle is parked, or in the event of failure of the primary service brake systems.

2. Description of the Prior Art

It has previously been proposed by Brislin in U.S. Pat. No. 747,370 to strap a flexible connector to the waist of a railway car operator and further to the actuating lever of an emergency brake system. If the vehicle operator should fall from his normal standing position, the weight of his body would pull on the connector and the brake lever, thus applying the emergency brake automatically.

However, the Brislin invention is not well suited to application in situations, as the trucking industry, in which the operator is not likely to fall with his full weight against the strap. Further, the device of the Brislin patent requires the initiative of the operator to strap himself into the device if it is to be operative. This would be of little use in vehicles, such as delivery trucks, in which the operator frequently leaves the vehicle, and may negligently fail to engage the emergency brake.

In U.S. Pat. No. 1,876,543 issued to Apple et al, an electric switch is incorporated into the operator's seat of a vehicle. Said switch is part of a circuit which supplies current to an electric motor which in turn drives a compressor supplying compressed air to a holding tank in a conventional air brake system. However, the switch has no function in applying either the emergency brake or the primary vehicle service brake, both of which are operated manually by the driver. The primary purpose of the switch is to prevent the electrically powered compressor from charging the brake system while the vehicle is left idle, thereby running down the battery.

U.S. Pat. No. 3,451,501 issued to Applegate also discloses an electric switch incorporated into the operator's seat for the purpose of actuating an emergency brake system. This switch is part of a circuit which incorporates two other switches, one actuated by depressing the service brake pedal, and the other actuated by clutching or gripping a member associated with the steering wheel. In this system, if any two of the three switches should be closed, then a mechanical emergency brake would be applied through the action of a solenoid. Thus in an emergency situation, if the driver should press down on the service brake and back against the seat, two of the three switches would close and the emergency brake would be engaged. Even if the service brake should fail, the emergency brake would be activated without unusual action by the driver.

Of course, the system of the Applegate patent would have no application to a situation in which the driver left the vehicle with the emergency or parking brake disengaged. Also if the driver were to become disabled, the Applegate system would require affirmative action by a passenger to apply the brake.

SUMMARY OF THE INVENTION

According to the present invention an otherwise conventional driver's seat is provided with a movable member, such as a hinged portion of the seat back, which is operatively connected to the actuating lever of a conventional emergency brake system, as by a spring loaded mechanical linkage.

Should the vehicle operator leave his seat or fall from a normal operating position therein, the hinged portion of the seat back would respond under the force of the spring to automatically throw the actuating lever of the emergency brake system.

In order to enable the vehicle operator to make ordinary movements while remaining in his seat, such as shifting gears or changing to a more comfortable position, a preferred embodiment of the invention incorporates a lost motion connection within the linkage between the movable portion of the seat and the brake actuating lever. Thus ordinary movements which an operator might make, while continuing to drive the vehicle, would not impart sufficient motion to the movable portion of the seat so as to activate the brake.

According to another feature of a preferred embodiment of this invention, the linkage between the movable portion of the seat and the brake actuating lever is a one way or unidirectionally acting connection. Thus if the operator leave his seat the movable portion of the seat will move in one direction and engage the brake. However, when the operator returns to his seat and the movable portion of the seat is returned to its original position, the brake will not be disengaged. Accordingly, a manually operated linkage is provided by which the operator may manually release the emergency brake upon his return to his seat. Thus, when the operator returns to his seat, the emergency brake will not be automatically released, so that the operator may settle himself and release the brake at such time as he is ready. Further, this feature of the invention allows the operator to manually engage the emergency brake even though he may still be in his seat. Thus it may be seen that the present invention combines features of a manually operated brake and an automatically operated brake so that the driver may manually engaged or disengage the brake at any time, but if the driver should leave or fall from his normal position without engaging the brake, it will automatically be so engaged.

It may be appreciated that the present invention is fully automatic in the sense that the vehicle operator need not take any affirmative action to make the system operative, as in the Brislin patent cited above. For this reason the present invention is well suited in applications such as delivery vehicles, where the operator leaves his seat frequently. Nor does the present invention rely upon the weight of the operator to supply the force to activate the brake, as in that patent.

Also in the preferred embodiments of this invention, there is no reliance on electrical devices which are subject to the danger of failure due to dead or worn down batteries.

BRIEF DESCRIPTION OF THE DRAWINGS

FIG. 1 is a side schematic view of a vehicle operator's seat showing the attachment and arrangement of the features of a typical embodiment of the present invention in their neutral position.

FIG. 2 is a side schematic view of the same seat assembly showing the position of the various parts in the position in which the emergency brake is activated, if the vehicle operator should fall from or leave his normal driving position.

FIG. 3 is a side schematic view of an alternate form of the present invention in which the linkages are enclosed inside of the seat back.

FIG. 4 is a detail view of a conventional air brake valve used in the preferred embodiments showing the arrangement and attachment of the activation and release linkages.

DESCRIPTION OF A PREFERRED EMBODIMENT

A seat for use by the operator of a truck or other vehicle has been generally designated 10. The seat has a two part seat back consisting of a fixed portion 12 and a movable portion 14, which is movable from a neutral position shown generally in FIG. 1 to an active position shown generally in FIG. 2.

Figure 6:
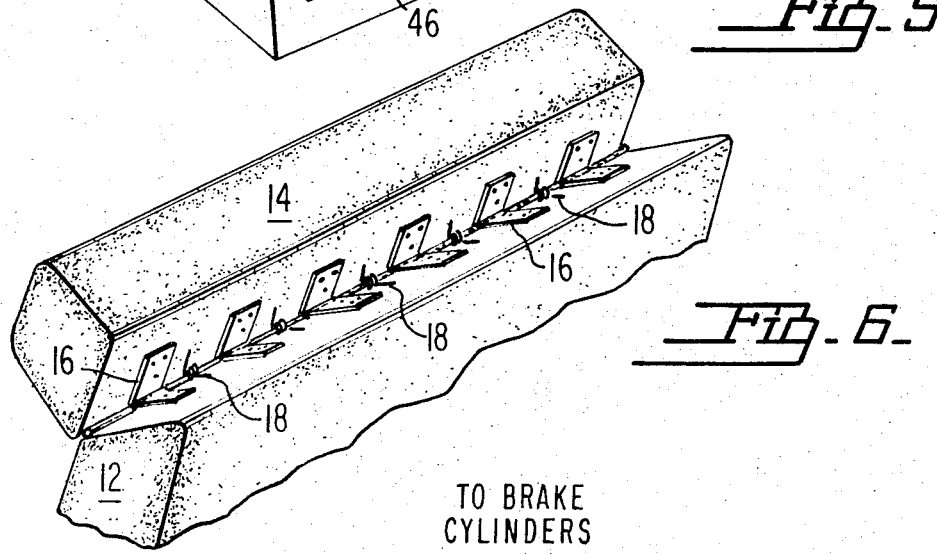
FIG. 6 is a detail view of the hinge and spring portion of the seat back, which may be embodied in that form of the invention illustrated in FIGS. 1 through 3.

In the embodiment shown in FIGS. 1 through 3 the movable portion 14 of the seat back is hinged to the fixed portion as at 16. The movable portion 14 is also subject to the force of a spring or springs which may be a torsion spring or springs 18 incorporated into the hinge assembly 16 as shown in FIG. 6.

The movable portion 14 of the seat back is connected to the brake actuating lever 20 by a mechanical linkage which consists of a support means or bracket 22 from which extends clearance arm 24, which bracket 22 and clearance arm 24 are rigidly attached to each other and to the movable portion 14 of the seat back. Clearance arm 24 is constructed in such a manner as to provide sufficient clearance between the fixed portion 12 of the seat back and other parts of the linkage.

Clearance arm 24 is preferably further attached by hinged joint 26 to connecting means such as rod 28. Connecting rod 28 then passes loosely through hole 30 in actuating lever 20 such that the connecting rod 28 is free to slide up and down and to move through a slight angle in hole 30. Connecting rod 28 is further provided at its end opposite the hinged joint 26 with means to trip actuating lever 20, as by a cross pin 32 which is not capable of passing through hole 30.

The construction of the joint between connecting rod 28 and actuating lever 20 serves to incorporate two features of this invention into the device described. Since connecting rod 28 is free to slide a short way through hole 30 before cross pin 32 moves up, a certain amount of motion is lost in the system. Thus normal movements of the vehicle operator while still in seat 10 will not be sufficient to cause lever 20 to be tripped by cross pin 32. Further, should the vehicle operator leave his seat, causing the brake to be engaged, the brake actuating lever 20 will not be returned to its disengaged position merely by the action of the operator returning to his seat and causing the movable portion 14 of the seat back to be returned to its neutral position.

Alternatively, clearance arm 24 and connecting rod 28 may be replaced by a flexible connector, such as a strap or chain which is attached at one end to bracket 22 and at the other to actuating lever 20. It may be seen that a flexible connector will also incorporate the advantages described above into the invention.

Figure 7:
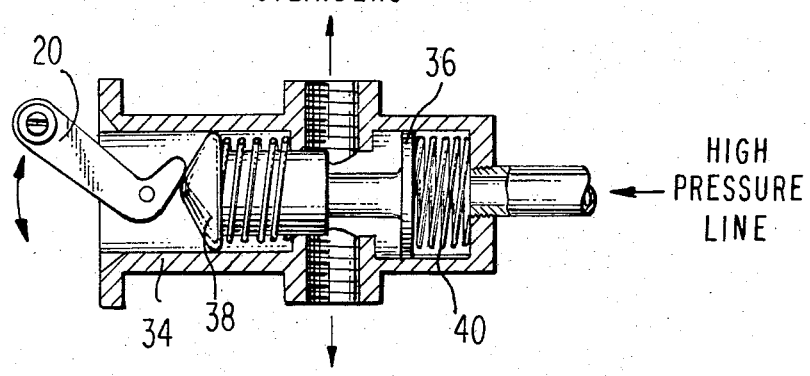
FIG. 7 is an enlarged detailed sectional view of the valve.

The brake actuating lever 20 is part of an assembly referred to generally as the brake valve 34 which is rigidly attached in a suitable location such as the fixed portion 12 of the seat back. Valve 34 may be of any suitable construction as is known to the art. For purposes of illustration, a typical valve for use in air brake systems is shown in cutaway fashion in FIG. 7. This assembly consists of a poppet valve 36 which is opened by the cam action of actuating lever 20 against cam follower 38. As shown in all of the drawings of this application the upward position of actuating lever 20 corresponds to the open position of poppet valve 36 in which position the brake would be engaged. Conversely, the downward position of actuating lever 20 corresponds to the closed position of poppet valve 36 in which the brake would be disengaged. Upon return of actuating lever 20 to its downward or disengaged position, poppet valve is closed by the force of return spring 40. Further, it should be noted that the end of actuating lever 20, which presses against cam follower 38, is shaped so as to provide a locking or detent function as well as a cam function so that actuating lever 20 will be held firmly in either of its engaged or disengaged positions.

Figure 5:
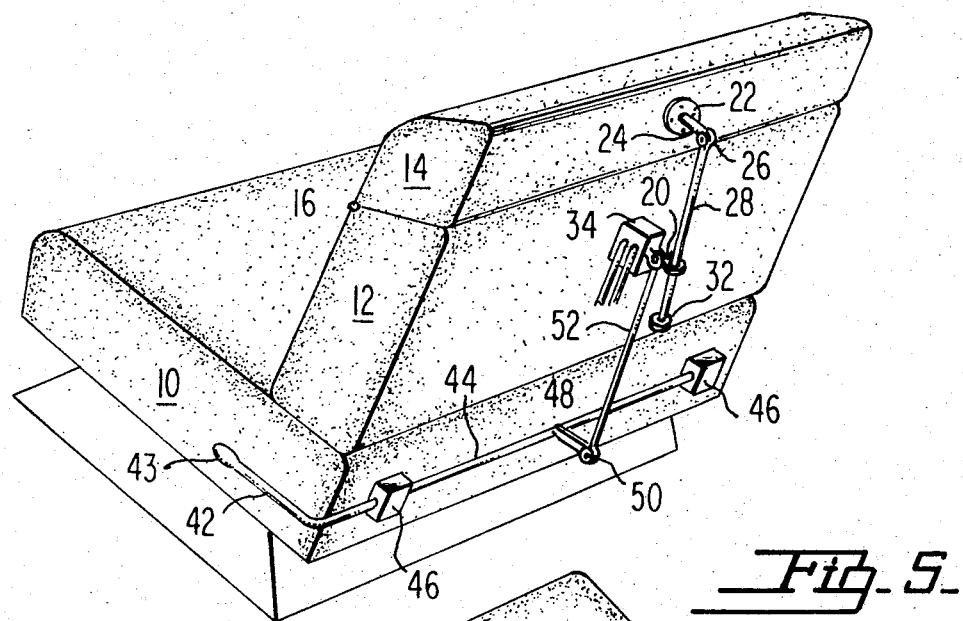
FIG. 5 is a perspective view of the seat, particularly showing a typical construction of the release linkage.

A release lever is also provided in the present invention which preferably consists of a lever arm 42 and handle 43 which are rigidly attached to transverse member 44. Transverse member 44 extends across the back of the base of seat 10, to the center thereof, as shown in FIG. 5, and is supported by sleeve bearings 46 which are affixed to the base of seat 10. At the end of transverse member 44 near the center of the back of seat 10 is affixed extension arm 48. Extension arm 48 is rigidly fixed to transverse member such that lever arm 42, extension arm 48 and transverse member 44 may rotate about the axis of transverse member 44 as one rigid unit. Extension arm 48 is connected at hinged joint 50 to connecting rod 52 which in turn is hinged at its opposite end, at 54, to brake actuating lever 20.

Alternately, the entire linkage of this invention may be enclosed within the structure of seat 10 as shown in FIG. 3. Further the lever arm 42 may be placed on either or both sides of seat 10.

OPERATION

In normal operation the movable portion 14 of the seat back will be in one of two positions. When the vehicle operator is seated in a normal driving position the movable portion 14 will be in a neutral position as shown in FIG. 1. With the movable portion 14 of the seat back in this position lever arm 42 may be moved manually so as to move actuating lever 20 to either its engaged or disengaged position.

Small movements of the vehicle operator will have no effect on the position of actuating lever 20 because of the lost motion feature of this invention. However, if the operator should leave his seat or fall from a normal position, the action of the spring 18 will cause the movable portion 14 of the seat to rotate forward around its hinge, thus causing connecting rod 28 to slide up through hole 30. If the brake has not previously been engaged manually, connecting rod 28 will slide up until cross pin 32 contacts actuating lever 20 and causes it to be moved to its engaged position, thus engaging the brake. Of course the spring 18 must be strong enough to overcome the weight of the movable portion 14 of the seat as well as any friction in the system and the resistance of the detent or locking mechanism within brake valve 34. However, it should not be so strong as to make the operator uncomfortable. As actuating lever 20 is pulled up to its engaged position, connecting member 52 will also be pulled up thus causing lever arm 42 to move down to its engaged position.

When the operator next returns to his seat, the movable portion 14 of the seat back will be moved back to its neutral position by the weight of the operator acting against the pressure of spring 18. Accordingly, connecting rod 28 will slide downward through hole 30, but actuating lever 20 will remain in its engaged position. This illustrates the unidirectionally acting feature of the operative connection between the movable portion of the seat and the brake actuating lever. At this point actuating lever 20 may only be released by the operator manually pulling up on lever arm 42 which will cause connecting member 52 to pull down on actuating lever 20, to its disengaged position.

It may be seen that except for the lost motion incorporated into this invention, each part of the device has two basic positions as determined by the engaged and disengaged positions of actuating lever 20. Further, the actuating lever 20 will tend to remain in either of its positions, unless otherwise acted upon by the mechanism of this invention by virtue of the locking or detent feature conventionally built in valve 34.

Although the preferred embodiments described above incorporate exclusively mechanical components, it will be obvious to one skilled in the art that electrical or hydraulic analogs may be constructed. For example, an electrical switch may comprise the movable portion of the seat, being connected by conductive wires to a solenoid for the purpose of moving the brake actuating lever. However, a mechanical system is viewed as being inherently more reliable, particularly since it does not rely upon a battery which would tend to run down during periods in which the vehicle was not operating. Further, it will be apparent to one skilled in the art that numerous changes may be made in the form, arrangement and positioning of the various elements of the present invention. In view thereof, it should be understood that the particular form of the invention herein disclosed is intended to be illustrative only, and is not intended to limit the scope of the invention.

I claim:

1. In a motor vehicle having a seat for an operator and a brake for controlling such vehicle, means for actuating such brake, which means is automatically responsive to the presence and absence of an operator in his seat, comprising a movable member associated with said seat and operatively connected to said brake, such movable member being movable from a first position in which such member acts to disengage the vehicle brake when the operator is in a normal driving position on said seat, to a second position in which such member acts to disengage said brake when the operator is not in a normal driving position on said seat, the movable member consisting of a two part seat back, one part of which is non-movable and conventionally attached to the base of the seat, and the other part of which is movable, and hinged to the non-movable part and subject to the pressure of a spring which will cause such movable part to rotate around its hinge in the absence of the force of a vehicle leaning against the seat back when said operator is in a normal driving position.

2. In a motor vehicle having a seat for an operator and a brake for controlling such vehicle, means for actuating such brake, which means is automatically responsive to the presence and absence of an operator in his seat, comprising a movable member associated with said seat and operatively connected to said brake, such movable member being movable from a first position in which such member acts to disengage the vehicle brake when the operator is in a normal driving position on said seat, to a second position in which such member acts to disengage said brake when the operator is not in a normal driving position on said seat, the movable member being movable from a neutral position in which said brake may be either engaged or disengaged when an operator is in a normal driving position on said seat, to an active position in which said movable member acts to engage said brake when the operator is not in a normal driving position on said seat, in combination with means for manually operating said brake comprising an element operatively connected to said brake, which may be manually controlled by the operator to either engage said brake regardless of the position of the operator and the aforementioned movable member, or to disengage said brake, but only if the operator is in a normal driving position and said movable member is in its neutral position, the operative connection between the movable member and the vehicle brake consisting of a mechanical linkage comprising a support member or bracket attached to the said movable member, a connecting member attached at one end to the support member, and at the other end to the actuating lever of a conventional brake system, such linkage providing a lost motion and unidirectionally operating connection between said movable member and said actuating lever, combined with means for manually operating the vehicle brake comprising a second movable member operatively connected to said brake and having two positions such that when said movable member is placed in one position the vehicle brake will be engaged, and when said movable member is placed in its second position the brake will be disengaged.

3. In a motor vehicle having a seat for an operator and a brake for controlling said vehicle, a brake-activating assembly for automatically engaging said brake in response to the operator's not being seated for normal driving and for allowing the same to be manually disengaged by the operator when the operator is seated for normal driving, comprising: a two-part seat back including a lower stationary part and an upper part hinged to the lower part under spring bias tending to urge said upper part to a position in which, in the absence of a driver not seated for normal driving, it projects forwardly from the lower part; means operable by movement of said upper part to said forwardly projecting position for engaging said brake and for leaving the same engaged on return movement of the lower part; and manually operable brake-disengaging means disposed for ready access to an operator when the operator is seated for normal driving.

4. A brake-activating assembly as in claim 3 wherein said brake-engaging means includes a brake-control valve on the lower part of the seat back and a lost-motion connection between the valve and the upper part of the seat back for operating the valve to a brake-engaging position following a predetermined amount of travel of said upper part toward the forwardly projecting position thereof.

5. A brake-activating assembly as in claim 4 in which the manually operable means for disengaging the brake includes a handle mounted upon the vehicle seat and a linkage connected between the handle and the valve for operating the valve to a brake-disengaging position responsive to throw of the handle by the operator when seated for normal driving.

* * * * *